Jan. 10, 1939.   C. S. CASE ET AL   2,143,299
COIL SPRING DEVICE
Filed Aug. 17, 1935
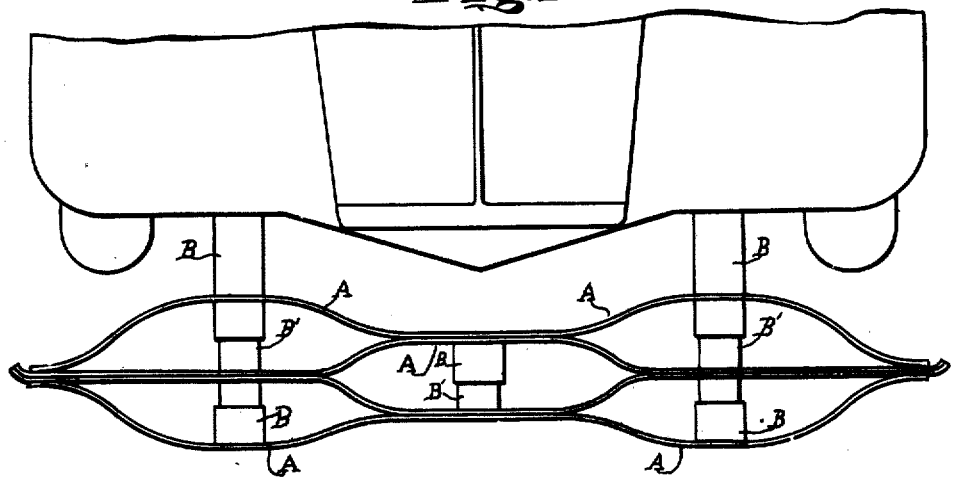
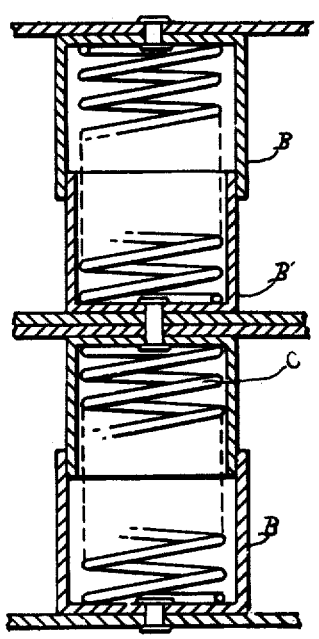
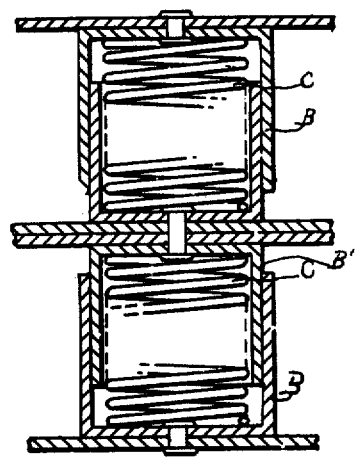

Patented Jan. 10, 1939

2,143,299

UNITED STATES PATENT OFFICE 2,143,299

COIL SPRING DEVICE

Charles S. Case and Carl Gratsinger,
Binghamton, N. Y.

Application August 17, 1935, Serial No. 36,707

3 Claims. (Cl. 293—55)

Our invention relates to an improvement in spring devices, more particularly a form of spring device to act in furnishing a buffer for the front and rear ends of automobiles. It has for its object to provide a new automobile buffer or bumper provided with a sliding resilient guard spring to provide elasticity in the buffer springs of an automobile, and at same time to enable such springs to be of a light but durable quality and affording and possessing tensile strength, and giving yielding elasticity.

With these objects in view our invention consists in certain novel features of construction and arrangement of parts as will be hereinafter fully described and pointed out in the claims, reference being had to the accompanying drawing, in which:—

Fig. 1 is a plan view of our device mounted on an automobile.

Fig. 2 represents a cross section on a part of said device.

Fig. 3 is a cross section view of a part of said device.

The same reference characters denote like parts in each of the several figures of the drawing.

In carrying out our invention, as a spring device, and a buffer for automobiles, we provide the extending spring bodies A, A, adjacent to each other, but spaced apart from each other in a bow-like position as shown in Fig. 1. Also as a further part of our device we mount in the horizontal projecting springs the tubular guarded springs in the form B and B'. It will be noted that the two extending spring bodies or springs A have a pair of bowed members connecting at the ends, and intermediate these bowed members is a pair of resilient flat spring members D connected at their ends to the bowed spring members. These intermediate members have bowed portions D¹ extending in opposite directions and contacting the spring members A intermediate the bowed ends. Interposed between the springs A and D are the guard springs B and B¹ which comprise telescoping members with compression springs such as the coiled springs C therein. These guard spring members are preferably located in the bowed portions of the buffer. In the bowed portions of the members A and between the outer member and the intermediate spring members is located the telescopic guard spring B, and at the rear between the inner spring member A and the intermediate spring D are located telescopic springs B¹. In the bowed portion of the intermediate springs is located a pair of telescoping guard springs B². By this assembly I provide a buffer which possesses great elasticity and is capable of taking up bumps and jars to which an automobile is subjected.

Having thus described our invention, what we claim as new and for which we desire Letters Patent is as follows:

1. In a spring bumper device for automobiles and the like, a pair of bowed resilient spring members connected at their ends, an intermediate resilient flat spring element connected to the ends of the bowed spring members and disposed in the same horizontal plane as that of the bowed resilient member, a series of telescopic tubular members disposed between each bowed spring member and the intermediate member, and compression spring devices within the tubular members.

2. In a spring bumper device for automobiles and the like, a pair of bowed resilient spring members connected at their ends, an intermediate resilient flat spring element connected to the ends of the bowed spring members and disposed in the same horizontal plane as that of the bowed resilient member, a series of telescopic tubular members disposed between each bowed spring member and the intermediate member, and coil springs disposed within the tubular members.

3. In a spring bumper device for automobiles and the like, a pair of bowed resilient spring members connected at their ends, an intermediate resilient flat spring element, connected to the ends of the bowed spring elements, said flat spring element being made of two flat members coincident with each other at the ends but bowed intermediate their ends with the bowed portions contacting the pair of bowed spring members, a series of telescopic tubular members disposed between the bowed members and also disposed between the bowed portion of the intermediate resilient section and compression spring devices between the tubular members.

CHARLES S. CASE.
CARL GRATSINGER.